Sept. 19, 1933.  A. D'HALLOY  1,927,705
LOCK NUT
Filed Nov. 21, 1928
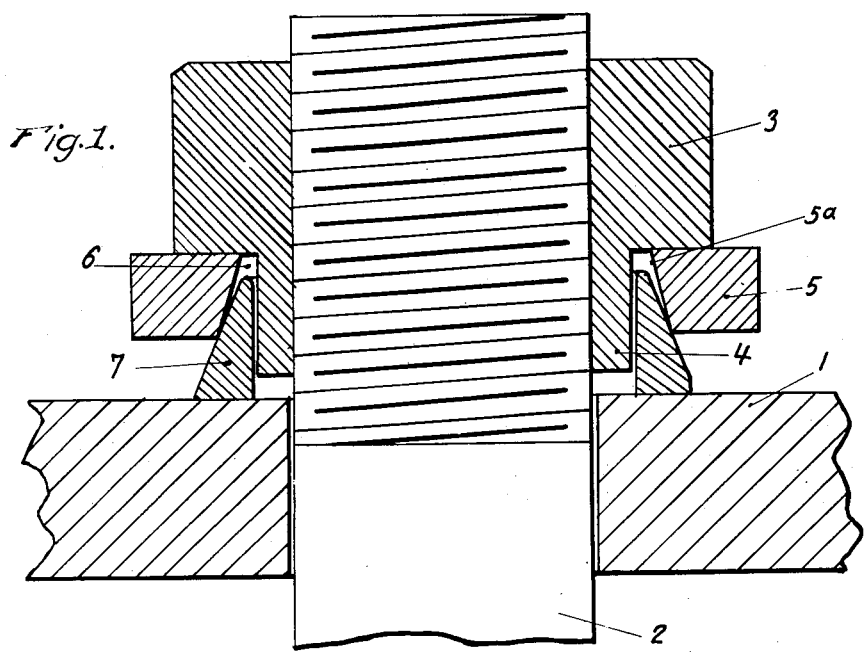
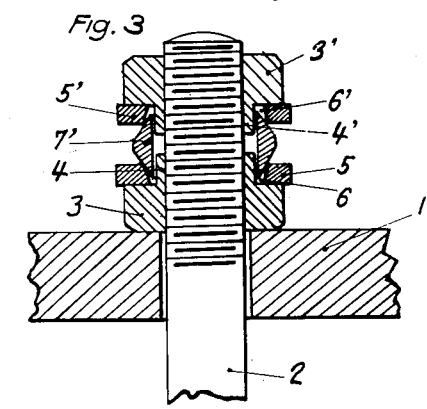
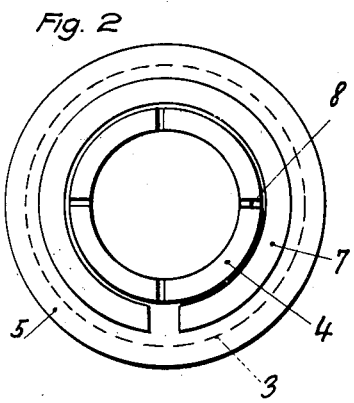
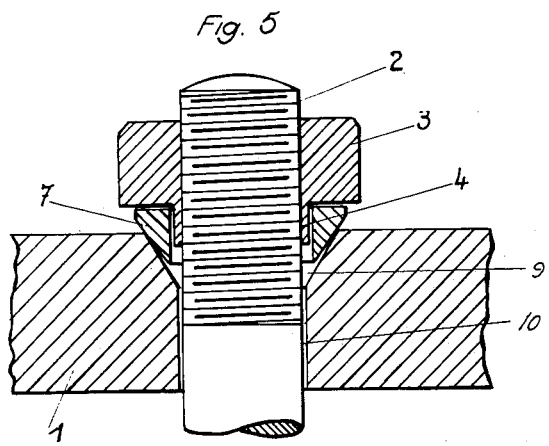
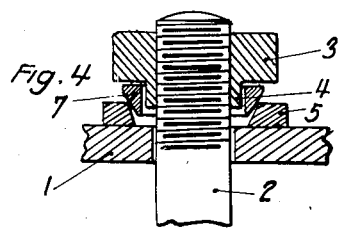
A. D'Halloy
INVENTOR Patented Sept. 19, 1933

1,927,705

UNITED STATES PATENT OFFICE

1,927,705

LOCK NUT

Audoin d'Halloy, Paris, France, assignor to International Safety Lock Nut Corporation, New York, N. Y., a corporation of Delaware Application November 21, 1928, Serial No. 320,960, and in France February 14, 1928

10 Claims. (Cl. 151—19)

This invention relates to improvements in or modifications of the invention claimed in United States Letters Patents Nos. 1,820,965 and 1,826,777.

The device described in the said prior patents comprises a split and elastic locking ring, preferably of the Grower type, which becomes wedged in an annular groove of corresponding shape provided in the base of the nut concentric with the screw thread, the said locking ring causing the central part, forming a screw threaded sleeve and extending between the groove and the hole in the nut to be gripped upon the bolt.

It has been found that the practical construction of such a groove from the base of the nut presents certain manufacturing difficulties in some cases, whether it is made on a lathe or whether it is obtained by forging, these difficulties being more particularly great in the case of nuts of small dimensions and in all cases producing waste in the manufacture and a rapid destruction of the tools.

The object of the present invention is to remove the above mentioned disadvantages and with this object in view it consists in employing, for the practical embodiment of the same principle of gripping the central sleeve, in combination with the split and radially and vertically elastic locking ring resembling the so called Grover type (called Grower in the French language) the ring being used to exert an axial thrust to bring the nut into intimate contact with the bolt, the nut being no longer a single member, but a combination of two parts which when joined together again make up the said grooved nut, these two parts being formed respectively by the body of the nut cut away in such a manner as to present a relatively thin screw threaded central sleeve, and by its base cut away in the form of a washer and bored to a greater diameter than the outer diameter of the said sleeve, for forming the groove.

By means of these improvements all the disadvantages of machining a groove in the nut starting from its base are obviated, thus enabling the invention to be carried out in a simple manner, even in the case of small nuts, in which the formation of the groove presents the greatest difficulties, and also further making it possible, to avoid the necessity of employing nuts of large widths, the said improvements having the general effect in all cases of producing a considerable reduction in the cost of the said locking devices.

In order to make the invention clearly understood various embodiments are hereinafter described and illustrated diagrammatically in the accompanying drawing by way of example.

In the drawing:

Fig. 1 is a vertical axial section of an embodiment of the invention.

Fig. 2 is a plan view from below Fig. 1, the assembling members and the bolt being assumed to be removed.

Fig. 3 is a similar view to Fig. 1 of a device comprising a nut, counter nut and locking ring with a double wedging surface.

Fig. 4 is a similar view to Fig. 1 of a modified form of mounting the constituent parts of the lock nut.

Fig. 5 is a similar view to Fig. 4 of a modification of the device shown in Fig. 4, according to which modification the base ring which forms, in combination with the body of the nut, the grooved nut, is dispensed with and replaced, with a view to performing the same functions, by the orifice of the hole or bore formed for the passage of the bolt through the member to be gripped, the said orifice being for this purpose countersunk or otherwise adapted and shaped.

In Figs. 1 to 3, 1 is one of the assembling members, 2 the bolt, 3 the body of an ordinary nut, machined in such a way as to present a central screw thread and relatively thin sleeve 4, and 5 is the cut away base forming an unbroken ring, the internal bore 5ª of which is formed in such a way as to combine with the outer wall of the central screw threaded sleeve 4 so as to form again the annular groove 6, of trapezoidal shape for example, for wedging the split and radially and vertically elastic ring 7 of the Grower type of corresponding shape to the said groove, the surface of contact of the base of the ring 7 corresponding to the shape of the surface of the member 1 to be gripped upon which it bears.

The whole having been assembled as shown in Fig. 1, an arrangement is obtained by the combination of these parts which is equivalent as regards its principle of operation, with the device described in the said prior specification.

The elasticity of the central screw threaded sleeve 4 is obtained in any known suitable manner, for example either by means of radial slits 8, or by boring a series of holes in this sleeve of any suitable section and height, opening in the interior of the screw thread if desired, or by making the sleeve 4 sufficiently thin.

In the case of the device comprising a nut, counter-nut and ring with a double wedging surface (Fig. 3), the same mode of construction obviously applies; the groove 6' in the counter-nut 3' adapted to receive one of the wedging surfaces of the ring 7' is formed by the outer wall of the central screw threaded sleeve 4' and the base ring 5' is bored internally in a manner absolutely identical with the construction of that of the nut 3.

The modification shown in Fig. 4 has chiefly in view the gripping of parts subjected to considerable vibrations such for example as fish plates on railways, that is to say, cases in which there may be objections to mounting the ring 7 directly in contact with the member to be gripped. In these cases it is advantageous in order to have an unbroken and flat ring in contact with the member 1, to reverse the direction of the groove 6, the split and elastic ring 7 being then mounted upon the central screw threaded sleeve 4 and being wedged in the bore in the base ring 5 arranged in contact with the member 1 of the assembled arrangement, thus avoiding the use of an additional ring.

The modification shown in Fig. 5 provides relatively to the device shown in Fig. 4, an improvement in that it permits the cost of production to be reduced by dispensing with one of the constituent parts, the operation remaining always identical in principle.

In this device the crest of the radially and vertically elastic and split locking ring 7 threaded over the central screw threaded sleeve 4 becomes wedged, when the body of the nut 3 is tightened, in a bore or other conformation of the orifice 9 of the hole or bore 10 formed for the passage of the bolt 2 in the member 1 and fulfilling the function previously fulfilled by the bore in the base of the ring 5.

In certain bases the device may be employed as a counter nut, the member 1 to be gripped being replaced by a nut in which it will have been sufficient to countersink the orifice of the screw threaded bore for the passage of the bolt.

It is clearly understood that it is possible without going outside the scope of the invention to envisage modifications and improvements in the constructional details. For example the base ring 5 may have any suitable profile and section and the outer wall of the central screw threaded sleeve 4 may be frustoconical in shape in order that it may, in combination with a base ring 5 having a frustoconical bore 5ª receive a locking ring with a double slope. Similarly, the lower face of the nut 3 and the upper face of the base ring 5 may adopt corresponding conical forms and may also be provided with ribs or the like.

What I claim is:

1. A clamping device comprising a bolt, a nut having a shoulder and a split sleeve encompassing said bolt, a member concentric with said sleeve and a split elastic member interposed between said member and sleeve and the member and the sleeve having opposing surfaces inclined so as to have a wedging action whereby upon tightening said nut the elastic member is radially displaced by the cooperation of said shoulder and member shifting said sleeve inwardly for transmitting a force longitudinally of said bolt to clamp said sleeve.

2. A clamping device comprising a bolt, a nut embodying a shoulder and a plurality of vertically disposed depending segments encompassing said bolt, a member having a tapering bore, a split elastic member having an inclined face cooperating with said bore and a vertically disposed face cooperating with said segments whereby upon the tightening of said nut said segments are inwardly displaced by said shoulders and members, transmitting a force longitudinally of said bolt for clamping said segments.

3. A clamping device comprising a bolt, a nut comprising a shoulder and a plurality of vertically disposed segments encompassing said bolt, a member having a tapering bore, a split elastic member comprising a face adapted to intimately engage the vertically disposed segments, and a bevelled face adapted to contact said tapering bore whereby upon the tightening of said nut said bored member forces the split elastic member to clamp the said segments against said bolt.

4. In a clamping device, the combination of a bolt, a nut having a shoulder and a split internally threaded sleeve encompassing the bolt, a member having a tapered circular opening through which the bolt extends, and a resilient split wedge-shaped ring member interposed between the sleeve and the tapered wall of the opening, one of said members being seated against the shoulder so that as the nut is screwed home the resilient split member is contracted to compress the sleeve onto the bolt.

5. In a nut and bolt assembly, the combination of a nut having a shoulder and an internally threaded resilient sleeve, a ring member surrounding the sleeve, and a split elastic washer surrounding the sleeve and spacing the ring member therefrom, the washer and the ring member having opposed inner and outer walls, respectively, so tapered as to have a wedging action and the shoulder co-operating with the ring member and the washer to contract the washer upon and compress the sleeve against the bolt as the nut is screwed home.

6. In a nut and bolt assembly according to claim 5 wherein the washer is seated against the shoulder.

7. In a nut and bolt assembly according to claim 5 wherein the ring member is seated against the shoulder.

8. In a nut and bolt assembly according to claim 5 characterized by the provision of a second nut having a shoulder, an internally threaded sleeve, a ring member surrounding the sleeve of the second nut, and the said washer being so shaped that a portion thereof is positioned between the sleeve of the second nut and the surrounding ring member.

9. In a clamping device, the combination of a bolt, a pair of oppositely disposed nuts having split sleeves encompassing said bolt, a pair of spatially disposed members surrounding the respective sleeves and having inclined inner walls, and a resilient member spacing said members from the respective sleeves and having inclined faces opposing the said inclined inner walls so as to have a wedging action whereby upon tightening of one of said nuts the bolt is clamped by said split sleeves.

10. In a clamping device, the combination of a bolt, a pair of oppositely disposed nuts having depending split sleeves encompassing said bolt and forming opposed shoulders, a ring member abutting each shoulder and having a tapered inner wall, and a split elastic member disposed between the sleeves and the ring members and having the outer wall thereof so tapered and co-operating with the tapered inner walls of the ring members as to have a wedging action whereby upon tightening of one of the nuts, the elastic member is displaced radially clamping said sleeves longitudinally of the bolt.

AUDOIN D'HALLOY.